United States Patent
Prakash et al.

(10) Patent No.: US 10,698,749 B1
(45) Date of Patent: Jun. 30, 2020

(54) SYSTEM AND A METHOD FOR AUTOMATED RESOLUTION OF CONFIGURATION ITEM ISSUES

(71) Applicant: Cognizant Technology Solutions India Pvt. Ltd, Chennai (IN)

(72) Inventors: Rohan Prakash, Bangalore (IN); Yogesh Sosale Gundurao, Bangalore (IN); Kamlanjan Kokolu, Bangalore (IN); Dhanalakshmi Perumal, Bangalore (IN); Krishnan Srinivasan, Chennai (IN); Jyoti Ranjan Panda, Chennai (IN)

(73) Assignee: COGNIZANT TECHNOLOGY SOLUTIONS INDIA PVT. LTD., Channai (IN)

(*) Notice: Subject to any disclaimer, the term of this patent is extended or adjusted under 35 U.S.C. 154(b) by 0 days.

(21) Appl. No.: 16/425,081

(22) Filed: May 29, 2019

(30) Foreign Application Priority Data

Apr. 1, 2019 (IN) .............................. 201941013194

(51) Int. Cl.
| | |
|---|---|
| G06F 3/00 | (2006.01) |
| G06F 9/44 | (2018.01) |
| G06F 9/46 | (2006.01) |
| G06F 13/00 | (2006.01) |
| G06F 9/54 | (2006.01) |
| G06F 11/07 | (2006.01) |
| G06F 9/445 | (2018.01) |
| G06F 40/295 | (2020.01) |

(52) U.S. Cl.
CPC .......... *G06F 9/542* (2013.01); *G06F 9/44505* (2013.01); *G06F 11/079* (2013.01); *G06F 40/295* (2020.01)

(58) Field of Classification Search
CPC ..................................................... G06F 9/543
USPC ......................................................... 719/318
See application file for complete search history.

(56) References Cited

U.S. PATENT DOCUMENTS

| | | | |
|---|---|---|---|
| 7,672,913 B2 | 3/2010 | Kaplan | |
| 2018/0308011 A1* | 10/2018 | Kalia | .................. G06F 11/0751 |

FOREIGN PATENT DOCUMENTS

WO         2017218699 A1    12/2017

* cited by examiner

*Primary Examiner* — Timothy A Mudrick
(74) *Attorney, Agent, or Firm* — Cantor Colburn LLP

(57) ABSTRACT

A system and method for automated resolution of events in a computing environment is provided. Problem types are identified from the events which are associated with configuration items (CIs) at issue. Further, domains of the CIs at issue are identified. Domains represent types of the CIs at issue. Existence of diagnosis and resolution sequences is checked which is based on identified problem types and domain associated with the CI types. Thereafter, diagnosis and resolution sequences are fetched, where sequences fetched at a first instance are at least in part updated with one or more new sequences. Fetched sequences are executed iteratively such that a next step of the executed diagnosis and resolution sequence is based on an output of a first step of the executed diagnosis and resolution sequence.

24 Claims, 4 Drawing Sheets

SYSTEM AND A METHOD FOR AUTOMATED RESOLUTION OF CONFIGURATION ITEM ISSUES

FIELD OF THE INVENTION

The present invention relates generally to the resolution of issues in a computing environment, and more particularly, the present invention relates to a system and a method for automated resolution of configuration item issues in a computing environment.

BACKGROUND OF THE INVENTION

In current scenarios, configuration items (CIs) in a computing environment, such as a client server architecture, must be up and running all the time owing to their consistent use. Examples of CI may include, but are not limited to, an application software, network components, a hardware component, an operating system, a firmware, central processing units, servers, databases or any other hardware or software component. Often, it has been observed that a situation may arise involving issues with the working of the CIs where the CIs fail to perform the requisite functions or perform their functions erroneously.

Conventionally, whenever there is an issue with a CI, a subject matter expert (SME) executes a sequence of actions against the CI or its associated components for resolving the issue. Typically, issues may include, but are not limited to, an application not working, web server not working, an application server not working etc. Further, based on output of each stage of solution that is executed, SMEs determine next action to be executed to resolve the problem. The SME executing actions for resolution of the issue associated with the CI may consume more time than required to provide solutions, as a lot of analysis needs to be done. Further, the solutions provided to a user by the SME may be prone to errors as the SME may execute a sequence not required for the particular CI. Further, there is a greater dependency on an SME for CI issue resolution and an issue may remain unresolved in the absence of an SME. Furthermore, the SME may not be able to view the sequence of solution once it is executed, to ascertain whether a correct sequence of solution has been provided. Furthermore, for instance, if a particular SME has provided and executed a particular solution for a CI at issue and another SME differs from that SME and wants to modify the solution provided by that SME, the other SME may not be able to modify the executed solution. Yet further, in existing solutions there is no option provided to pause the execution of solution at a particular stage to verify the correctness of solution or abort an executed solution if found to be incorrect.

In light of the aforementioned drawbacks, there is a need for a system and a method for automating application of solutions for resolution of issues related to CIs in a computing environment for providing effective and speedy solutions. Further, there is a need for minimizing errors which may occur during execution of a sequence of solutions. Furthermore, there is a need for a system and a method which minimizes dependency on SMEs for resolution of issue related to CIs. Further, there is a need for a system and a method which has the capability to allow modification of executed sequence of solutions.

SUMMARY OF THE INVENTION

In various embodiments of the present invention, a method for automated resolution of one or more events in a computing environment is provided. The method is implemented by a processor configured to execute program instructions stored in a memory. The method comprises identifying one or more problem types from the events. The identified problem types are associated with one or more configuration items (CIs) at issue. The method further comprises identifying one or more domains of the CIs at issue. The domains represent one or more types of the CIs at issue. The method further comprises checking existence of one or more diagnosis and resolution sequences. The checking of the diagnosis and resolution sequences is based on the identified problem types and the domain associated with the CI types. The method further comprises fetching the diagnosis and resolution sequences. The diagnosis and resolution sequences fetched at a first instance are at least in part updated with one or more new diagnosis and resolution sequences. Further, the method comprises executing the fetched diagnosis and resolution sequences iteratively such that a next step of the executed diagnosis and resolution sequence is based on an output of a first step of the executed diagnosis and resolution sequence.

In various embodiments of the present invention, a system for automated resolution of one or more events in a computing environment is provided. The system comprises a memory storing program instructions, a processor configured to execute instructions stored in the memory and an intelligent sequencing engine in communication with the processor. The system is configured to identify one or more problem types from one or more events. The identified problem types are associated with one or more configuration items (CIs) at issue. The system is further configured to identify one or more domains of the CIs at issue. The domains represent one or more types of the CIs at issue. The system is further configured to check existence of one or more diagnosis and resolution sequences. The checking of the diagnosis and resolution sequence is based on the identified problem types and the domain associated with the CI types. The system is further configured to fetch the diagnosis and resolution sequences. The diagnosis and resolution sequences fetched at a first instance are at least in part updated with one or more new diagnosis and resolution sequences. Further, the system is configured to execute the fetched diagnosis and resolution sequences iteratively such that a next step of the executed diagnosis and resolution sequence is based on an output of a first step of the executed diagnosis and resolution sequence.

In various embodiments of the present invention, a computer program product is provided. The computer program product comprises a non-transitory computer-readable medium having computer-readable program code stored thereon, the computer-readable program comprising instructions that, when executed by the processor, causes the processor to identify one or more problem types from one or more events. The identified problem types are associated with one or more configuration items (CIs) at issue. Further, the processor is caused to identify one or more domains of the CIs at issue. The domains represent one or more types of the CIs at issue. Further, the processor is caused to check existence of one or more diagnosis and resolution sequences. The checking of the diagnosis and resolution sequence is based on the identified problem types and the domain associated with the CI types. Further, the processor is caused to fetch the diagnosis and resolution sequences. The diagnosis and resolution sequences fetched at a first instance are at least in part updated with one or more new diagnosis and resolution sequences. Finally, the processor is caused to execute the fetched diagnosis and resolution sequences iteratively such that a next step of the executed diagnosis and resolution sequence is based on an output of a first step of the executed diagnosis and resolution sequence.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention discloses a system and a method for automated resolution of issues related to configuration items (CIs) in a computing environment. The invention provides for an intelligent mechanism for predicting a sequence of solution stages for resolution of issues related to a CI. The invention provides for using machine learning techniques for training the system to automate and predict the sequence of resolution stages for resolution of issues related to a CI, thereby reducing the dependency on subject matter experts (SMEs). The invention further provides for visualization and modification of the executed sequence of solution stages for an affected CI. Further, the present invention facilitates pausing or aborting the executed resolution sequence(s) at any stage. Further, the invention provides for increasing efficiency of the overall resolution mechanism for a CI at issue.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
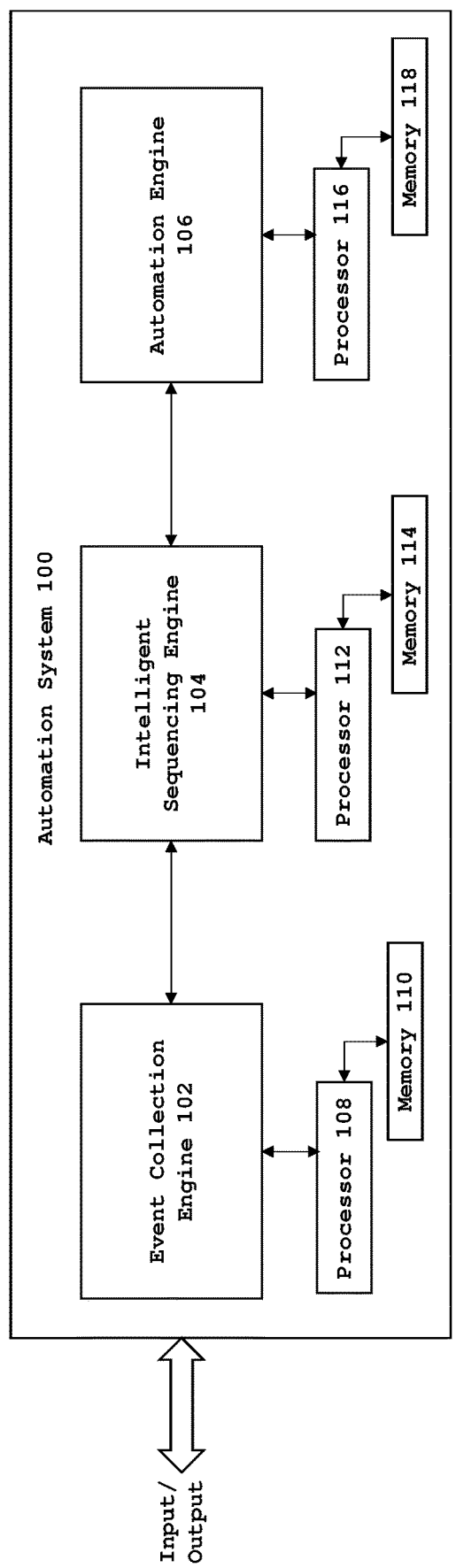
FIG. 1 illustrates a block diagram of a system for automated resolution of configuration item issues, in accordance with various embodiments of the present invention.

FIG. 1 illustrates a block diagram of an automation system 100 for automated resolution of issues related to configuration items (CIs) in a computing environment, in accordance with various embodiments of the present invention. Referring to FIG. 1, in an embodiment of the present invention, the system 100 comprises an event collection engine 102, an intelligent sequencing engine 104 and an automation engine 106. In various embodiments of the present invention, the event collection engine 102 operates in conjunction with a processor 108 which executes instructions stored in a memory 110, the intelligent sequencing engine 104 operates in conjunction with a processor 112 which executes instructions stored in a memory 114 and the automation engine 106 operates in conjunction with a processor 116 which executes instructions stored in a memory 118. In an exemplary embodiment of the present invention, the computing environment comprises multiple users using various CIs via one or more user terminals (not shown) which are connected via a communication channel, such as, a local area network (LAN), metropolitan area network (MAN), wide area network (WAN), or any wired or wireless network to the automation system 100.

In another embodiment of the present invention, the system 100 may be implemented in a cloud computing architecture in which data, applications, services, and other resources are stored and delivered through shared datacenters. In an exemplary embodiment of the present invention, the functionalities of the system 100 are delivered to a user as software as a service (SaaS) over a communication network.

In another embodiment of the present invention, the system 100 may be implemented as a client-server architecture. In said embodiment of the present invention, a client terminal accesses a server hosting the system 100 over a communication network. The client terminals may include but are not limited to a smart phone, a computer, a tablet, microcomputer or any other wired or wireless terminal. The server may be a centralized or a decentralized server.

In an embodiment of the present invention, the event collection engine 102 is configured to receive one or more issue associated with one or more configuration items (CIs) via one or more user terminal (not shown) of a user. The CIs may include, but are not limited to, an application software, network components, a hardware component, an operating system, a firmware, central processing units, servers, databases or any other hardware or software component in a computing environment. The issue is received as an event at the event collection engine 102. In an exemplary embodiment, the event is received as, but is not limited to, an incident, an activity, a token, a request, an alert, a ticket or the like.

In an embodiment of the present invention, the intelligent sequencing engine 104 is capable of being trained by one or more cognitive techniques, such as, artificial intelligence, machine learning or the like. The artificial intelligence or machine learning techniques applied may include, but are not limited to, neural network techniques, natural language understanding (NLU) or the like. In various embodiments of the present invention, the intelligent sequencing engine 104 identifies and triggers diagnosis and resolution sequences based on the received event, identifies cause of the issue and identifies and provides a set of sequence to be executed for an event resolution associated with the CI at issue.

In an embodiment of the present invention, the intelligent sequencing engine 104, is trained by inputting the sequence of steps for resolving a particular event by the end-user. The sequence of steps for resolving a particular event may be inputted to form a sequence of set of instructions, which are referred to as a story(s). In another embodiment of the present invention, a story is generated by the intelligent sequencing engine 104 for resolving a particular event based on the training provided by inputting the sequence of steps for resolving a particular event by the end-user. The generated story is different for every event and is stored in the intelligent sequencing engine 104 as a log file. Further, a unique identification number is assigned to a log file of every story inputted by the intelligent sequencing engine 104 before storing. The unique identification number assigned, may include, but is not limited to, an alphanumeric code, a hex code or the like.

In operation, in an embodiment of the present invention, the intelligent sequencing engine 104 is configured to receive an event from the event collection engine 102. The intelligent sequencing engine 104 has built-in capability to identify a domain of the CI associated with the event. The domain identification is carried out for categorizing the CI into different domains. The different domains may include, but are not limited to, an application type, a technology type or a location type or the like. In an exemplary embodiment of the present invention, the domain identification is carried out for invoking a particular sequence for resolution of the event associated with the CI for the particular application type or the technology type or location type. Further, the domain identification is carried out for categorizing the training data based on the CIs domain before the training data is fed to the intelligent sequencing engine 104 for training. Further, after the identification of the domain name of the CI, a unique identification number is assigned to the identified domain of a particular CI. The unique identification number assigned, may relate to, but is not limited to, alphanumeric code, hex code or the like.

In an embodiment of the present invention, the intelligent sequencing engine 104 analyzes the received event to identify a problem type associated with an event. The problem type associated with the event may include, but is not limited to, a computing service not operable, a website not operable, a network issue, a web server non-functional, an application server non-functional, a hardware component non-functional or the like. The intelligent sequencing engine 104 identifies the type of the problem using machine learning techniques, such as, but are not limited to, natural language understanding (NLU) or the like.

In an embodiment of the present invention, after identification of the problem type, the intelligent sequencing engine 104 performs a check to retrieve a sequence of steps which are to be applied for resolving the particular event associated with a particular CI of a particular domain. The sequence of steps are referred to as 'diagnosis and resolution' sequence. If a sequence of steps exists for resolving the particular event of a particular domain, the sequence of steps are rendered via user interface (UI) for resolving a particular event of a particular domain associated with a particular CI. The intelligent sequencing engine 104 is trained by inputting one or more diagnosis and resolution sequences related to the particular event of the particular CI related to the particular domain for predicting the sequence of steps to be applied for a particular event using machine learning techniques such as, but are not limited to, neural network techniques or the like.

Further, if a diagnosis and sequence is not found by the intelligent sequencing engine 104, for the particular event associated with the CI of the particular domain, the end-user performs the resolution at his end and provides the applied diagnosis and resolution sequence for resolution of an event to the user. After successful resolution of the event, the end-user is prompted to feed the executed sequence of steps, for event resolution, to the intelligent sequencing engine 104 as training data. The end-user may execute multiple diagnosis and resolution sequences for an event associated with a CI. The multiple diagnosis and resolution sequences are fed as stories to the intelligent sequencing engine 104 for training. The stories fed are used by the neural network techniques to train the intelligent sequencing engine 104 for predicting the correct diagnosis and resolution sequence for resolution of an event. A log file is maintained in the intelligent sequencing engine 104 for the stories fed.

In an embodiment of the present invention, after the intelligent sequencing engine 104 is trained to execute a diagnosis and resolution sequence for resolution of an event, the end-user triggers the diagnosis and resolution sequence. A command for resolution of an event is sent by the end-user via the user interface (UI) and received by the intelligent sequencing engine 104 via the event collection engine 102. After receiving the command, the intelligent sequencing engine 104 performs a check to fetch a recommended sequence for event resolution and provides it to the end-user in an automated manner via the UI for execution. The intelligent sequencing engine 104 is configured to recommend sequence of steps in an automated manner on the basis of the output status of the previous step and the current state of the CI. For example, if a CI is an application server which is non-functional, the intelligent sequencing engine 104 provides a first step which requires the end-user to reconnect to the database or server. In this scenario, the output of the first step may be that a database or a server is not reachable. Based on the output status of the first step, the second step provided is to restart the database and after restarting the database the application server is again functional.

In another embodiment of the present invention, the resolution of an event is performed in an automated manner. The intelligent sequencing engine 104 upon receiving an event from the user via the event collection engine 102 invokes the automation engine 106. The automation engine 106 interacting with the intelligent sequencing engine 104 automates the fetching of the diagnosis and resolution sequence for resolution of a particular event. The sequence fetched is executed in an automated manner, without any human intervention, for resolving the received event related to the particular CI. The automated execution of the sequence is performed in an iterative manner based on the output of the previous sequence step executed, until the intelligent sequence engine 104 reaches the end of the sequence.

In yet another embodiment of the present invention, the end-user may define a set of rules which are associated with a particular event in the intelligent sequencing engine 104. The set of rules defined relates to the particular event associated with the CI. The set of rules defined in the intelligent sequencing engine 104 allows the execution of the sequence for resolution of an event in an automated manner. When the event is received by the intelligent sequencing engine 104 via the event collection engine 102, the intelligent sequencing engine 104 triggers the set of rules associated with that particular event. The triggered set of rules invokes the diagnosis and resolution sequence in an iterative manner for resolving the particular event for which the set of rules are defined.

In an embodiment of the present invention, the intelligent sequencing engine 104 provides an ability to view the diagnosis and resolution sequence which was executed for diagnosis and resolution of a particular event by the user. The user may view the diagnosis and resolution sequence via the UI where visualization of the diagnosis and resolution sequence may be represented via a tree form, a graph form, hierarchical form, freestyle form or the like. The visual display, such as, a tree, depicts nodes which provides the steps of diagnosis and resolution sequence which are executed and facilitates users to track the steps of event resolution.

In an embodiment of the present invention, the intelligent sequencing engine 104 allows the end-user to edit, modify or make changes in the diagnosis and resolution sequence being executed by the intelligent sequencing engine 104 or fed to the intelligent sequencing engine 104 for training. In an exemplary embodiment of the present invention, if the end-user differs from the automated diagnosis and resolution sequence steps executed by the intelligent sequencing engine 104, the end-user can abort the diagnosis and resolution sequence via the UI or pause and modify the diagnosis and resolution sequence via the UI and thereafter, continue with the modified diagnosis and resolution sequence.

Figure 2:
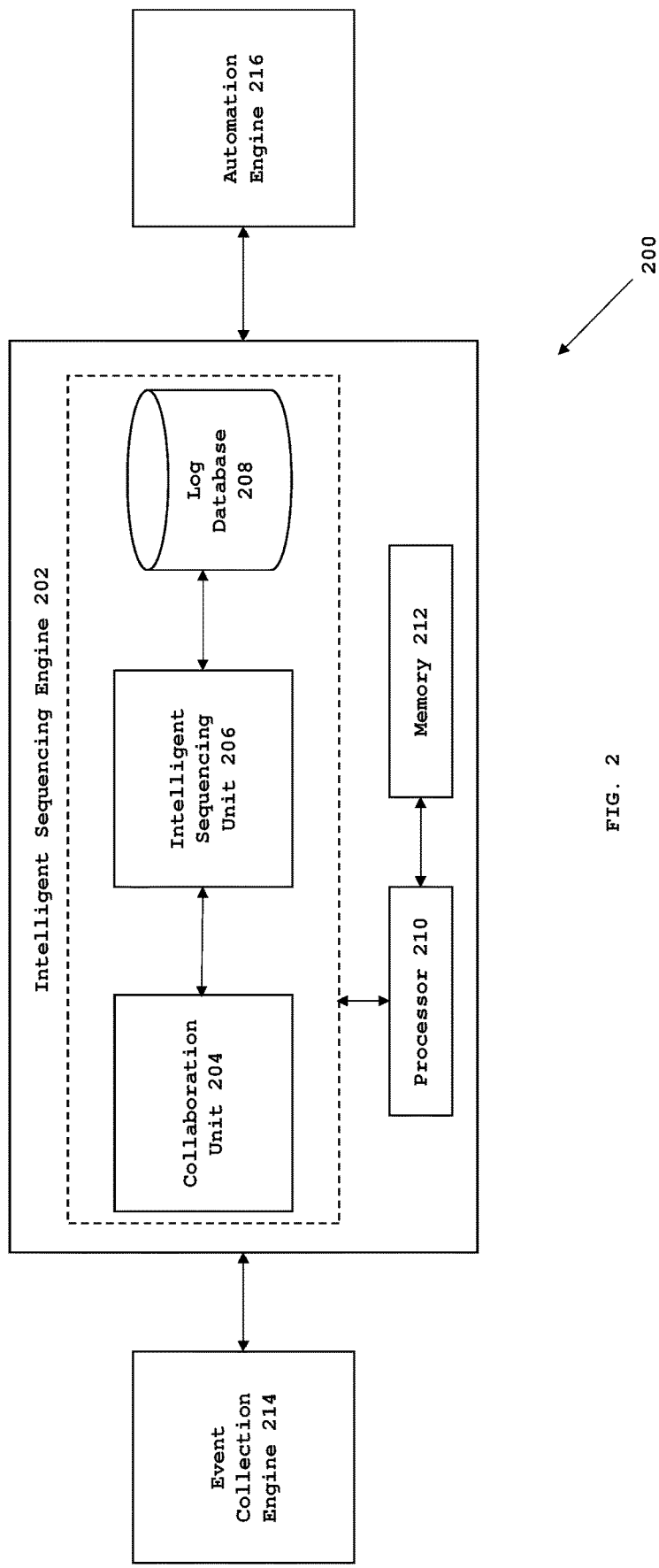
FIG. 2 illustrates a detailed block diagram of an intelligent sequencing engine, in accordance with various embodiments of the present invention.

FIG. 2 is a detailed block diagram of an intelligent sequencing engine which is configured to automate the resolution of issues related to configuration items (CIs), in accordance with various embodiments of the present invention. The intelligent sequencing engine 202 interfaces with an event collection engine 214 for receiving one or more events associated with the CI at issue from one or more users. The intelligent sequencing engine 202 further interfaces with an automation engine 216 for automating the execution of the diagnosis and resolution sequence generated and executed by the intelligent sequencing engine 202.

In an embodiment of the present invention, the intelligent sequencing engine 202 comprises a collaboration unit 204, an intelligent sequencing unit 206 and a log database 208. In various embodiments of the present invention, the collaboration unit 204, the intelligent sequencing unit 206 and the log database 208 operate in conjunction with a processor 210 which executes instructions stored in a memory 212.

In an embodiment of the present invention, the collaboration unit 204 is configured to receive one or more events via the event collection engine 214. In an exemplary embodiment, the event is received as, but is not limited to, an incident, an activity, a token, a request, an alert, a ticket or the like. In operation, the collaboration unit 204 on receiving the event is configured to identify the problem type associated with the event. The collaboration unit 204 identifies the problem type using various machine learning techniques which may include, but are not limited to, natural language understanding (NLU), entity extraction technique or the like based on the received event. In an exemplary embodiment of the present invention, the problem type relates to one or more issues associated with the CI such as, but not limited to, a computing service not operable, a website not operable, a network issue, a web server is non-functional, an application server is non-functional, a hardware component is non-functional or the like.

In an embodiment of the present invention, the collaboration unit 204 is further configured to identify the domain of the CI to which the problem type associated with the event may relate. The domain identification is further carried out using cognitive techniques such as, but are not limited to, natural language understanding (NLU) or the like. The domain identification is carried out for categorizing the CI into, at least, application type, location type or technology type. Further the categorized CI into the particular domain invokes the particular diagnosis and resolution sequence associated with the identified domain of the CI for resolution of the particular event. The domain identification of the CI is carried out using, at least, the following techniques: (a) checking CI's application and using it as domain name; (b) checking CI's location and using it as domain name; or (c) checking CI's technology and using it as domain name.

Further, after the identification of the domain name of the CI, a unique identification code is assigned to the identified domain of a particular CI. The unique identification code assigned, may relate to, but is not limited to, alphanumeric code, hex code or the like.

In an embodiment of the present invention, the intelligent sequencing unit 206 is configured to receive the processed data related to the event and associated domain type from the collaboration unit 204 via an application programing interface (API). The API may include, but is not limited to, RESTful API, SOAP, XML-RPC, JSON-RPC, or the like. The data received by the intelligent sequencing unit 206 may include, but is not limited to, one or more events associated with one or more CI at issue's, diagnosis and resolution sequence training data fed by the end-user, problem type associated with the event, etc. In an embodiment of the present invention, the intelligent sequencing unit 206 is capable of being trained by inputting training data. The data for training the intelligent sequencing unit 206 is fed via the collaboration unit 204. The training data fed may include, but is not limited to, one or more sequence of resolution steps relating to one or more CI at issue or the like. In an embodiment of the present invention, training data fed to train the intelligent sequencing unit 206 is capable of being modified by the end-user. The intelligent sequencing unit 206 utilizes cognitive techniques for predicting diagnosis and resolution sequence for one or more events associated with a CI, without any human intervention, based on the data fed for training. The intelligence sequence unit 206 utilizes artificial intelligence and machine learning techniques which may include, but is not limited to, neural network techniques or the like. The neural network techniques used may include, but not LIMITED to, feedforward neural network, radial basis function neural network, Kohonen self-organizing neural network, Recurrent Neural Network, modular neural network or the like.

In an exemplary embodiment of the present invention, the diagnosis and resolution sequence for training the intelligent sequencing unit 206 is communicated via the collaboration unit 204 as a story(s). The API performs a check to confirm whether a diagnosis and resolution sequence associated with a particular domain of an event already exists in the log database 208. If the diagnosis and resolution sequence exists and a new diagnosis and resolution sequence is communicated to the intelligent sequencing unit 206, then the already existing diagnosis and resolution sequence is replaced and updated with the new diagnosis and resolution sequence for the event associated with the CI of particular domain and is further, registered in the log database 208.

In operation, in an embodiment of the present invention, the intelligent sequencing unit 206 is configured to predict the diagnosis and resolution sequence steps for resolution of the event associated with a CI. Further, the diagnosis and resolution sequence steps are predicted for resolution of the event associated with the CI at issue. The diagnosis and resolution sequence to be fetched, by the intelligent sequencing unit 206, is stored in the log database 208. The fetching of the diagnosis and resolution sequence is based on the cognitive techniques applied and the training data fed to intelligent sequencing unit 206 via the collaboration unit 204. In an embodiment of the present invention, the intelligent sequencing unit 206 is configured to receive an input from the collaboration unit 204, which may relate to an event associated with the CI at issue and in response communicate the first step of diagnosis and resolution sequence, which is to be executed. Based on the output of the executed first step of diagnosis and resolution sequence, the next step for resolution is communicated. The same process is carried out until the diagnosis and resolution sequence reaches the last step and the event associated with the CI at issue of a particular domain is completely resolved. In an embodiment of the present invention, the intelligent sequencing unit 206 predicts the diagnosis and resolution sequence steps by applying machine learning techniques such as, but not limited to, neural network techniques or the like.

In operation, in an embodiment of the present invention, the prediction and execution of the diagnosis and resolution sequence by the intelligent sequencing unit 206 is carried out in an automated manner by interacting with the automation engine 216. The invoking of the intelligent sequencing unit 206 for predicting and executing the diagnosis and resolution sequence is carried out upon receiving an event associated with the particular CI of the particular domain from one or more users. Further, the intelligent sequencing unit 206 is configured to provide the diagnosis and resolution sequence in steps which is to be applied by the user. The user executes a first step of the provided diagnosis and resolution sequence for resolving the issue related to the CI. Based on an output of the first step of the provided diagnosis and resolution sequence, the intelligent sequencing unit 206 provides a next step of the diagnosis and resolution sequence to the user for execution. The intelligent sequencing unit 206 provides the diagnosis and resolution sequence until the issue is completely resolved. Further, in another embodiment of the present invention, the intelligent sequencing unit 206 executes the diagnosis and resolution sequence in an iterative manner, after receiving the event associated with the particular CI of the particular domain from the user. The intelligent sequencing engine 206 executes the diagnosis and resolution sequence in an iterative manner until it reaches the end of the sequence and the event associated with the CI is completely resolved.

In yet another embodiment of the present invention, the invoking of the intelligent sequencing unit 206 for fetching and execution of the diagnosis and resolution sequence is based on a defined set of rules. The set of rules are defined in the collaboration unit 204. The defined set of rules may include, but are not limited to, a policy, a condition or an action. The defined set of rules relates to the particular event associated with the particular CI of the particular domain. The defined set of rules are applied for invoking the intelligent sequencing unit 206 for fetching the particular diagnosis and resolution sequence related to the particular event associated with the particular CI of the particular domain from the log database 208. In an exemplary embodiment of the present invention, an event associated with the particular CI of the particular domain received by the collaboration unit 204 is processed to trigger a set of rules associated with the particular event. Further, based on the triggered set of rules the intelligent sequencing unit 206 is invoked. The intelligent sequencing unit 206 provides a diagnosis and resolution sequence for resolving an event associated with the CI at issue. The diagnosis and resolution sequence is executed iteratively in an automated manner via the automation engine 216, until the end of diagnosis and resolution sequence is reached. Further, a scenario may arise, during automated execution of the diagnosis and resolution sequence, where a parameter is not defined in the set of rules associated with an event of a particular CI. For example, the parameter not defined may include, but is not limited to, identification name of user not present, storage location of the diagnosis and resolution sequence not present or the like. The collaboration unit 204 stops the execution of the diagnosis and resolution sequence at that point and provides an option to the end-user to feed the said parameter. After the parameter is fed the execution of the diagnosis and resolution sequence is resumed by the collaboration unit 204. In an exemplary embodiment of the present invention, the diagnosis and resolution sequence is resumed as the end-user clicks 'continue option' in the UI. The diagnosis and resolution sequence is thereafter resumed from the step where is was stopped.

In an embodiment of the present invention, the collaboration unit 204 is configured to allow the user and the end-user to view for reviewing the diagnosis and resolution sequence executed by the intelligent sequencing unit 206. Further, the collaboration unit 204 is configured to provide the view of the diagnosis and resolution sequence before the diagnosis and resolution sequence is executed by the intelligent sequencing unit 206. The diagnosis and resolution sequence may be viewed by the end-user via the UI which facilitates the end-user to track and validate the appropriate diagnosis and resolution sequence for an event associated with a particular CI of a particular domain. Further, the end-user may be able to view the diagnosis and resolution sequence which is fed for training the intelligent sequencing unit 206. The type of view of the diagnosis and resolution sequence provided may include, but is not limited to, a tree form, a graphical form or the like. In another embodiment of the present invention, the collaboration unit 204 allows the display, in the UI, of the diagnosis and resolution sequence which is predicted by the intelligent sequencing unit 206. The view of the diagnosis and resolution sequence to the user and the end-user is provided using viewing techniques such as, but are not limited to, tracker visualization or the like. In an exemplary embodiment of the present invention, the display of the executed or predicted diagnosis and resolution sequence may include, but is not limited to, the diagnosis and resolution sequence for the particular CI of the particular domain with various problem types, the state of the CI at issue after execution of each stage of the diagnosis and resolution sequence, the next action to be executed based on the current state of the CI at issue or the like.

Further, in an exemplary embodiments of the present invention, the user or the end-user may pause the diagnosis and resolution sequence which is being executed for reviewing or abort the diagnosis and resolution sequence which is being executed if the diagnosis and resolution sequence is found to be incorrect. The pausing of the diagnosis and resolution sequence may stop the execution of further steps for resolution of issues related to the CI. The end-user may select a 'continue option' on the UI and resume the execution of paused diagnosis and resolution sequence from the stage or step at which it was paused. Further, the diagnosis and resolution sequence may be terminated by the intelligent sequencing unit 206 subsequent to the end-user aborting the diagnosis and resolution sequence. Further, the user or end-user may be able to view the stage or step at which the diagnosis and resolution sequence was paused or aborted. In another exemplary embodiment of the present invention, the end-user may modify the diagnosis and resolution sequence fed for training, if at the time of viewing the diagnosis and resolution sequence in the UI is found to be incorrect.

In an embodiment of the present invention, the log database 208 is configured to store one or more diagnosis and resolution sequences associated with one or more events associated with one or more CI of one or more domains. Further, a separate file is created in the log database 208 of the diagnosis and resolution sequence which is executed, CI on which the diagnosis and resolution sequence which is executed, the domain to which the CI belongs, output status of executed diagnosis and resolution sequence, the output format and any new diagnosis and resolution sequences inputted. Further, a unique identification number is affixed to the created logs. In an embodiment of the present invention, the previously stored diagnosis and resolution sequences may be updated when one or more new and efficient diagnosis and resolution sequences are fed for resolving the event associated to the CI.

Advantageously, in accordance with various embodiments of the present invention, the system 200 is configured with built-in intelligence to predict the diagnosis and resolution sequence for resolving an event associated with a CI at issue of a particular domain without any human intervention. The system 200 is capable of being fed with various diagnosis and resolution sequences which can be invoked in an automated manner for diagnosing a CI at issue. Further, the end-user can modify the course of diagnosis and resolution sequence before being fed to system 200 for training. Furthermore, the user and the end-user may view the diagnosis and resolution sequence via the UI, which facilitates the end-user to view the stages or steps of diagnosis and resolution sequence that is being executed by the system 200. Further, the present invention permits the pausing of the diagnosis and resolution sequences which are being executed for making any modifications to it or aborting the executed diagnosis and resolution sequence, if found to be incorrect for issue resolution related to the particular CI.

Figure 3:
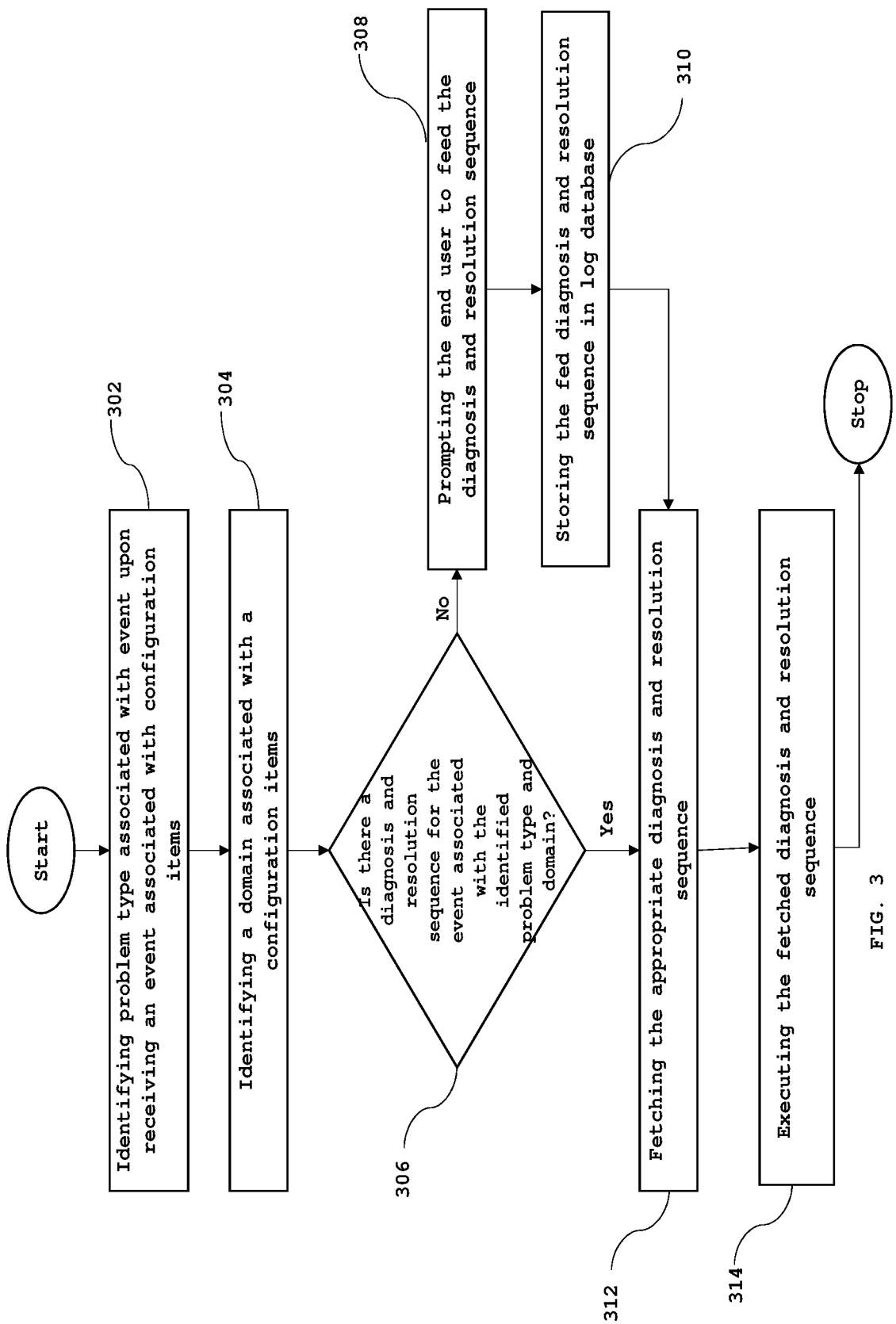
FIG. 3 is a flowchart illustrating a method for automated resolution of configuration item issues, in accordance with various embodiments of the present invention.

FIG. 3 is a flowchart illustrating a method for automated resolution of issues related to configuration items, in accordance with various embodiments of the present invention.

At step 302, an event associated with a configuration items (CIs) at issue is received. In various embodiments of the present invention, an issue associated with the CI is received as an event. In an exemplary embodiment, the event is received as an incident, an activity, a token, a request, an alert, a ticket or the like. Further, the event is processed to identify a problem type associated with the event. The problem type associated with the event relates to one or more issues associated with the CI and include, but is not limited to, a computing service not operable, a website not operable, a network issue, a web server is non-functional, an application server is non-functional, a hardware component non-functional or the like. The type of problem is identified using machine learning techniques, such as, but is not limited to, natural language understanding (NLU), entity extraction or the like.

At step 304, a domain associated with the CI at issue is identified. In an embodiment of the present invention, domain identification is carried out for categorizing the CI into different domains. The different domains may include, but are not limited to, an application type, a technology type or a location type or the like. In an embodiment of the present invention, the domain identification is carried out for invoking a particular sequence for resolution of the event associated with the CI for the particular application type or the technology type or location type. The domain identification is further carried out using cognitive techniques such as, but are not limited to, natural language understanding (NLU) or the like. The domain identification of the CI is carried out using one of the, at least, following techniques;
(a) checking CI's application and using it as domain name;
(b) checking CI's location and using it as domain name; or
(c) checking CI's technology and using it as domain name.
Further, after the identification of the domain name of the CI, a unique identification code is assigned to the identified domain of a particular CI. The unique identification code assigned, may relate to, but is not limited to, alphanumeric code, hex code or the like. At step 306, a check is performed to retrieve a sequence of issue resolution steps, i.e. a diagnosis and resolution sequence. In an embodiment of present Invention, the check is performed to identify availability of a diagnosis and resolution sequence for diagnosing the particular event of a particular domain associated with the particular CI of an identified problem type.

At step 308, if a diagnosis and resolution sequence is not found for the particular event of the particular domain associated with the CI, the end-user performs the diagnosis at his end and provides the applied diagnosis and resolution sequence for diagnosing the event. After successful diagnosis of the event, the end-user is provided an option to feed the executed sequence of steps, for event resolution, as training data. The end-user can execute multiple diagnosis and resolution sequences for an event associated with the CI. The multiple diagnosis and resolution sequences are fed as stories. The stories fed are used by the neural network techniques to train the system for predicting the correct diagnosis and resolution sequence for resolution of an event. At step 310, the diagnosis and resolution sequence is stored and maintained as a log file which is updated from time to time with new one or more diagnosis and resolution sequences.

At step 312, if a diagnosis and resolution sequence exists, the diagnosis and resolution sequence is fetched for diagnosing the particular event associated with the particular CI of the particular domain.

At step 314, the fetched diagnosis and resolution sequence is executed iteratively. In an embodiment of the present invention, the diagnosis and resolution sequence is executed iteratively upon receiving the event associated with the particular CI and the particular domain from one or more users. The diagnosis and resolution sequence in steps which is to be applied by the user. The user executes a first step of the provided diagnosis and resolution sequence for resolving the issue related to the CI. Based on an output of a first step of execution of the diagnosis and resolution sequence, a next step of the diagnosis and resolution sequence for execution is provided to the user for execution. The diagnosis and resolution sequence is executed until the issue is completely resolved. Further, in another embodiment of the present invention, the diagnosis and resolution sequence is executed in an iterative manner for the particular CI of the particular domain. The diagnosis and resolution sequence is executed in an iterative manner after receiving the event until the end of sequence and the issue is completely resolved.

In yet another embodiment of the present invention, the diagnosis and resolution sequence is executed based on a defined set of rules. The set of rules may include, but is not limited to, a policy, a condition or an action. The defined set of rules relates to the particular event associated with the particular CI of the particular domain. In an exemplary embodiment of the present invention, an event associated with the particular CI of the particular domain received is processed to fetch a set of rules associated with the particular event. The defined set of rules fetches a diagnosis and resolution sequence for resolving the event associated with the CI at issue. The diagnosis and resolution sequence is executed iteratively in an automated manner until the end of sequence is reached. Further, a situation may occur, during execution of the diagnosis and resolution sequence, where a parameter is not defined in the set of rules associated with an event of a particular CI. For example, the parameter not defined may include, but is not limited to, the identification name of user not present, the storage location of the diagnosis and resolution sequence not present or the like. The execution of the diagnosis and resolution sequence at that point is stopped and an option to the end-user is provided to feed the said parameter. After the parameter is fed the execution of the diagnosis and resolution sequence is resumed. In an embodiment of the present invention, the diagnosis and resolution sequence may be resumed when the end-user clicks a 'continue option' in the UI. The diagnosis and resolution sequence is thereafter resumed from the step where it was stopped.

In an embodiment of the present invention, the user and the end-user may be able to view the diagnosis and resolution sequence for reviewing the diagnosis and resolution sequence which was executed. Further, viewing of the diagnosis and resolution sequence is provided before the diagnosis and resolution sequence is executed. The diagnosis and resolution sequence may be viewed by the end-user via the UI which facilitates the end-user to track and validate the appropriate diagnosis and resolution sequence for an event associated with a particular CI of a particular domain. Further, the end-user may be able to view the diagnosis and resolution sequence which is fed for training the system. The type of view of the diagnosis and resolution sequence provided may include, but is not limited to, a tree form, a graphical form or the like. In another embodiment of the present invention, prior to execution of the predicted diagnosis and resolution sequence, it is displayed in the UI. The view of the diagnosis and resolution sequence to the user and the end-use is provided using viewing techniques such as, but are not limited to, tracker visualization or the like. In an exemplary embodiment of the present invention, the display of the executed or predicted diagnosis and resolution sequence may include, but is not limited to, the diagnosis and resolution sequence for the particular CI of the particular domain with various problem types, the state of the CI at issue after execution of each stage of the diagnosis and resolution sequence, the next action to be executed based on the current state of the CI at issue or the like.

Further, in an exemplary embodiments of the present invention, the user or the end-user may pause the diagnosis and resolution sequence which is being executed for reviewing or abort the diagnosis and resolution sequence which is being executed if the diagnosis and resolution sequence is found to be incorrect. The pausing of the diagnosis and resolution sequence may stop the execution of further steps for resolution of issues related to the CI. The end-user may select a 'continue option' on the UI and resume the execution of paused diagnosis and resolution sequence from the stage or step at which it was paused. Further, the diagnosis and resolution sequence may be terminated subsequent to the end-user aborting the diagnosis and resolution sequence. Further, the user or end-user may be able to view the stage or step at which the diagnosis and resolution sequence was paused or aborted. In another exemplary embodiment of the present invention, the end-user may modify the diagnosis and resolution sequence fed for training, if at the time of viewing the diagnosis and resolution sequence in the UI is found to be incorrect.

Figure 4:
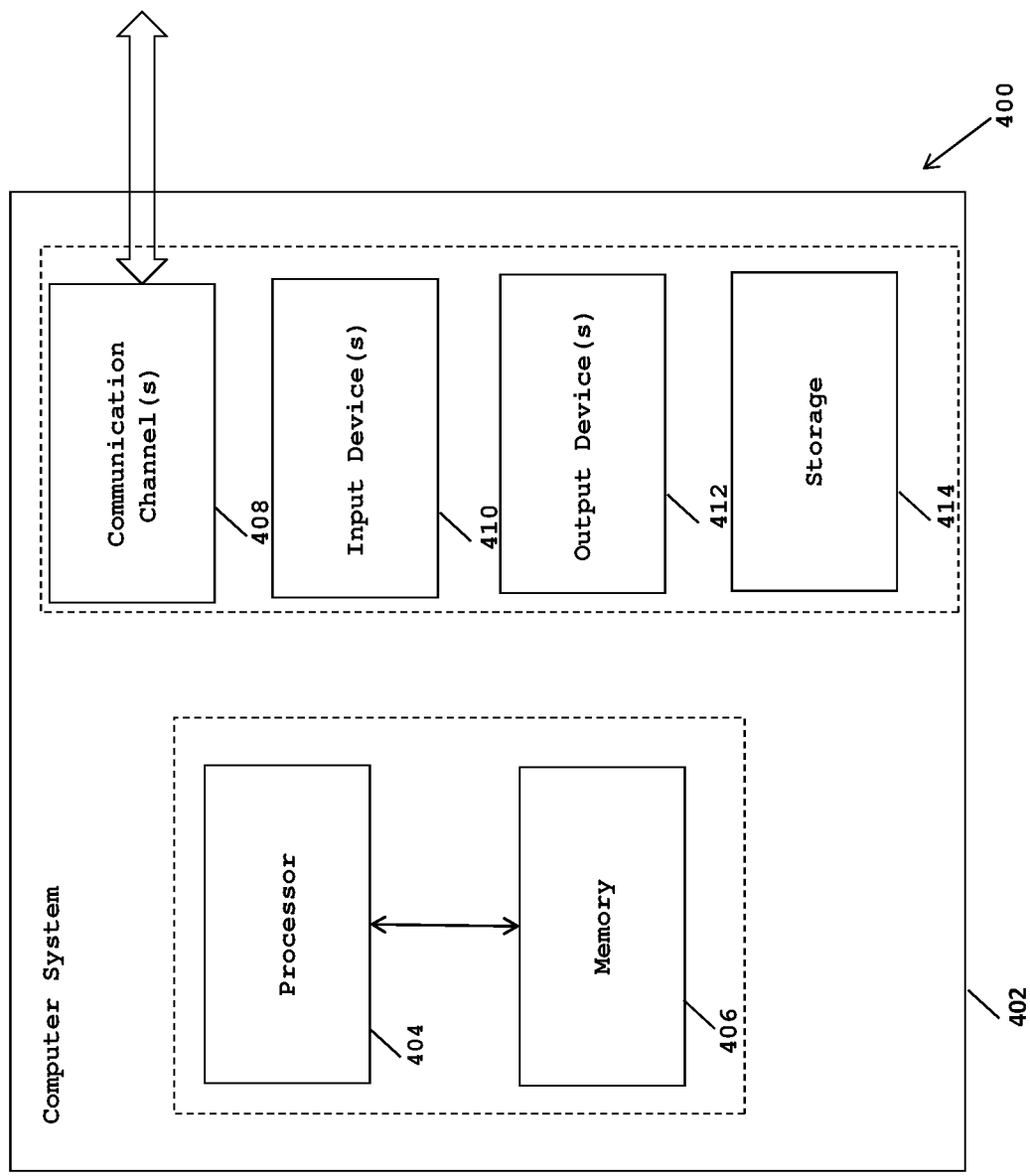
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various software's executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for automated resolution of one or more events in a computing environment, the method is implemented by a processor configured to execute program instructions stored in a memory, the method comprising:
   identifying one or more problem types from the events received from user terminals, wherein the identified problem types are associated with one or more configuration items (CIs) at issue;
   identifying one or more domains of the CIs at issue, wherein the domains represent one or more types of the CIs at issue;
   checking existence of one or more diagnosis and resolution sequences, wherein the checking of the diagnosis and resolution sequences is based on the identified problem types and the domain associated with the CI types;
   fetching the diagnosis and resolution sequences, wherein the diagnosis and resolution sequences fetched at a first instance are at least in part updated with one or more new diagnosis and resolution sequences; and
   executing the fetched diagnosis and resolution sequences iteratively such that a next step of the executed diagnosis and resolution sequence is based on an output of a first step of the executed diagnosis and resolution sequence, wherein the executed diagnosis and resolution sequences is capable of being paused for reviewing and the execution is resumed from the paused stage.

2. The method as claimed in claim 1, wherein the events received includes at least one of: an incident, an activity, a token, a request, an alert, and a ticket.

3. The method as claimed in claim 1, wherein the CIs at issue includes at least one of: an application software, network components, a hardware component, an operating system, a firmware, central processing units, servers, and databases.

4. The method as claimed in claim 1, wherein the identification of the problem types is carried out using at least one of natural language understanding (NLU) techniques and entity extraction techniques.

5. The method as claimed in claim 1, wherein the problem types associated with the CI types include at least one of: a computing service not operable, a website not operable, a network issue, a web server is non-functional, an application server is non-functional, a software application is non-functional and a hardware component is non-functional.

6. The method as claimed in claim 1, wherein the CI types include at least one of an application type, a location type or a technology type of a CI at issue.

7. The method as claimed in claim 1, wherein the step of identifying the domains of the CIs at issue includes at least one of: checking CI's application and using it as domain name, checking CI's location and using it as domain name, and checking CI's technology and using it as domain name.

8. The method as claimed in claim 1, wherein the diagnosis and resolution sequences comprises one or more sequence of steps for diagnosis and resolution of the events associated with the CIs of the identified domains.

9. The method as claimed in claim 1, wherein the diagnosis and resolution sequences are executed in a sequence of steps until the events associated with the CIs associated with the domain is completely resolved.

10. The method as claimed in claim 1, wherein the execution of diagnosis and resolution sequences is carried out by providing the first step of the diagnosis and resolution sequences and based on the output of the executed first step the next step of diagnosis and resolution sequence is provided for execution until the events associated with the CIs is completely resolved.

11. The method as claimed in claim 1, wherein the fetching and execution of the diagnosis and resolution sequences is based on one or more defined set of rules, and wherein the defined set of rules relates to the events associated with the CIs related to the domains.

12. The method as claimed in claim 11, wherein the defined set of rules fetches and executes the diagnosis and resolution sequences iteratively such that the next step of the diagnosis and resolution sequence is provided based on the output of the first step of the executed diagnosis and resolution sequence until the events associated with the CIs associated with the domain is completely resolved.

13. The method as claimed in claim 1, wherein the executed diagnosis and resolution sequences are displayed for tracking and validation.

14. The method as claimed in claim 1, wherein the diagnosis and resolution sequences is fed as training data, and wherein the diagnosis and resolution sequences fed as training data is capable of being paused for reviewing and modifications.

15. The method as claimed in claim 1, wherein the executed diagnosis and resolution sequences are capable of being aborted if the executed diagnosis and resolution sequences are found to be incorrect.

16. A system for automated resolution of one or more events in a computing environment, the system comprising:
   a memory storing program instructions;
   a processor configured to execute instructions stored in the memory; and
   an intelligent sequencing engine in communication with the processor and configured to:
   identify one or more problem types from one or more events received from user terminals, wherein the identified problem types are associated with one or more configuration items (CIs) at issue;
   identify one or more domains of the CIs at issue, wherein the domains represent one or more types of the CIs at issue;
   check existence of one or more diagnosis and resolution sequences, wherein the checking of the diagnosis and resolution sequence is based on the identified problem types and the domain associated with the CI types;
   fetch the diagnosis and resolution sequences, wherein the diagnosis and resolution sequences fetched at a first instance are at least in part updated with one or more new diagnosis and resolution sequences; and
   execute the fetched diagnosis and resolution sequences iteratively such that a next step of the executed diagnosis and resolution sequence is based on an output of a first step of the executed diagnosis and resolution sequence, wherein the executed diagnosis and resolution sequences is capable of being paused for reviewing and the execution is resumed from the paused stage.

17. The system as claimed in claim 16, wherein the intelligent sequencing engine comprises a collaboration unit in communication with the processor, said collaboration unit is configured to identify the problem types associated with the events associated with the CIs utilizing at least a natural language understanding (NLU) technique and entity extraction techniques.

18. The system as claimed in claim 16, wherein the intelligent sequencing engine in communication with an automation engine is configured to execute the diagnosis and resolution sequences by providing the first step of the diagnosis and resolution sequences and based on the output of the executed first step providing the next step of diagnosis and resolution sequence for execution until the events associated with the CIs is completely resolved.

19. The system as claimed in claim 16, wherein the intelligent sequencing engine in communication with the automation engine fetches and executes the diagnosis and resolution sequences based on one or more defined set of rules, and wherein the defined set of rules relates to the events associated with the CIs related to the domains.

20. The system as claimed in claim 19, wherein the defined set of rules fetches and executes the diagnosis and resolution sequences iteratively such that the next step of the diagnosis and resolution sequence is provided based on the output of the first step of the executed diagnosis and resolution sequence until the events associated with the CIs associated with the domain is completely resolved.

21. The system as claimed in claim 16, wherein the intelligent sequencing engine comprises an intelligent sequencing unit in communication with the processor, said intelligent sequencing unit is capable of being trained by inputting diagnosis and resolution sequence training data.

22. The system as claimed in claim 21, wherein the intelligent sequencing unit is configured to predict and execute the diagnosis and resolution sequences based on the output of the executed first step of the diagnosis and resolution sequences.

23. The system as claimed in claim 16, wherein the diagnosis and resolution sequences are stored in a log database, wherein the log database is updated from time to time based on feeding of one or more new diagnosis and resolution sequences.

24. A computer program product comprising:
a non-transitory computer-readable medium having computer-readable program code stored thereon, the computer-readable program comprising instructions that, when executed by the processor, causes the processor to:
identify one or more problem types from the events received from user terminals, wherein the identified problem types are associated with one or more configuration items (CIs) at issue;
identify one or more domains of the CIs at issue, wherein the domains represent one or more types of the CIs at issue;
check existence of one or more diagnosis and resolution sequences, wherein the checking of the diagnosis and resolution sequence is based on the identified problem types and the domain associated with the CI types;
fetch the diagnosis and resolution sequences, wherein the diagnosis and resolution sequences fetched at a first instance are at least in part updated with one or more new diagnosis and resolution sequences; and
execute the fetched diagnosis and resolution sequences iteratively such that a next step of the executed diagnosis and resolution sequence is based on an output of a first step of the executed diagnosis and resolution sequence, wherein the executed diagnosis and resolution sequences is capable of being paused for reviewing and the execution is resumed from the paused stage.

* * * * *